(12) United States Patent
Becker et al.

(10) Patent No.: US 9,809,724 B2
(45) Date of Patent: Nov. 7, 2017

(54) RADIATION-CURABLE FORMULATIONS WITH HIGH ADHESION

(71) Applicant: BASF SE, Ludwigshafen (DE)

(72) Inventors: Axel Becker, Altrip (DE); Erich Beck, Ladenburg (DE); Manfred Biehler, Ilbesheim (DE)

(73) Assignee: BASF SE, Ludwigshafen (DE)

( * ) Notice: Subject to any disclaimer, the term of this patent is extended or adjusted under 35 U.S.C. 154(b) by 370 days.

(21) Appl. No.: 14/420,071

(22) PCT Filed: Aug. 1, 2013

(86) PCT No.: PCT/EP2013/066162
§ 371 (c)(1),
(2) Date: Feb. 6, 2015

(87) PCT Pub. No.: WO2014/023639
PCT Pub. Date: Feb. 13, 2014

(65) Prior Publication Data
US 2015/0218408 A1    Aug. 6, 2015

Related U.S. Application Data

(60) Provisional application No. 61/681,170, filed on Aug. 9, 2012.

(30) Foreign Application Priority Data

Aug. 9, 2012   (EP) .................................. 12179892

(51) Int. Cl.
| | | |
|---|---|---|
| *C08F 2/46* | (2006.01) | |
| *C08F 2/50* | (2006.01) | |
| *C08G 61/04* | (2006.01) | |
| *C09D 133/14* | (2006.01) | |
| *C09D 4/00* | (2006.01) | |
| *C08L 61/00* | (2006.01) | |
| *C08L 61/24* | (2006.01) | |
| *C09D 133/00* | (2006.01) | |
| *B05D 1/18* | (2006.01) | |
| *B05D 3/06* | (2006.01) | |
| *C09D 133/08* | (2006.01) | |
| *C09D 175/02* | (2006.01) | |
| *D21H 19/20* | (2006.01) | |

(52) U.S. Cl.
CPC ............ *C09D 133/14* (2013.01); *B05D 1/18* (2013.01); *B05D 3/067* (2013.01); *B05D 3/068* (2013.01); *C08L 61/00* (2013.01); *C08L 61/24* (2013.01); *C09D 4/00* (2013.01); *C09D 133/00* (2013.01); *C09D 133/08* (2013.01); *C09D 175/02* (2013.01); *D21H 19/20* (2013.01); *Y10T 428/31964* (2015.04); *Y10T 442/20* (2015.04)

(58) Field of Classification Search
CPC .. C09D 133/14; C09D 133/08; C09D 175/02; C09D 4/00; C09D 133/00; D21H 9/20; Y10T 442/20; Y10T 428/31964; B05D 3/067; B05D 1/18; B05D 3/068; C08L 61/24
USPC ................. 522/33, 6, 71, 189, 184, 1; 520/1
See application file for complete search history.

(56) References Cited

U.S. PATENT DOCUMENTS

| | | | |
|---|---|---|---|
| 4,243,797 A | 1/1981 | Petersen et al. | |
| 4,710,523 A | 12/1987 | Lechtken et al. | |
| 4,909,915 A * | 3/1990 | Bederke ............... | C09D 5/4411 204/489 |
| 5,534,559 A | 7/1996 | Leppard et al. | |
| 5,744,248 A | 4/1998 | Meixner et al. | |
| 6,096,797 A | 8/2000 | Prantl et al. | |
| 6,562,464 B1 | 5/2003 | Schwalm et al. | |
| 7,105,206 B1 | 9/2006 | Beck et al. | |
| 2003/0199609 A1* | 10/2003 | Yamanouchi ........ | C09D 11/101 523/160 |
| 2006/0009589 A1 | 1/2006 | Haering et al. | |

FOREIGN PATENT DOCUMENTS

| | | |
|---|---|---|
| CA | 2059145 | 7/1992 |
| DE | 19618720 | 11/1996 |
| DE | 19739620 | 3/1999 |
| DE | 19826712 | 12/1999 |
| DE | 19913353 | 9/2000 |
| DE | 19957900 | 6/2001 |
| DE | 10-2004-026325 | 12/2005 |
| EP | 0002794 | 7/1979 |
| EP | 0007508 | 2/1980 |
| EP | 0057474 | 8/1982 |
| EP | 0495751 | 7/1992 |
| EP | 0615980 | 9/1994 |
| EP | 0789065 | 8/1997 |
| EP | 0902065 | * 3/1999 |
| EP | 2239286 | 10/2010 |
| WO | WO-98/33761 | 8/1998 |
| WO | WO-2006/005491 | 1/2006 |
| WO | WO-2009/095282 | 8/2009 |
| WO | WO-2010/144901 | 12/2010 |
| WO | WO-2010/144903 | 12/2010 |

OTHER PUBLICATIONS

Reich et al, EP 0902065 Machine Translation, Mar. 17, 1999.*
PCT International Search Report in PCT/EP2013/066162, dated Oct. 16, 2013, 3 pages.

* cited by examiner

*Primary Examiner* — Jessica E Whiteley
(74) *Attorney, Agent, or Firm* — Marshall, Gerstein & Borun LLP

(57) ABSTRACT

Described are radiation-curable formulations which produce coatings having high adhesion to sheets and low contraction. Also described is use of the radiation-curable formulations, and processes for coating sheets by means of these formulations.

9 Claims, No Drawings

RADIATION-CURABLE FORMULATIONS WITH HIGH ADHESION

CROSS-REFERENCE TO RELATED APPLICATIONS

This is application is the National Stage Entry of PCT/EP2013/066162, filed Aug. 1, 2013, which claims priority to U.S. Provisional Application Ser. No. 61/681,170, filed Aug. 9, 2012, and European Patent Application 12179892.0, filed Aug. 9, 2012, the disclosures of which are incorporate herein by reference in their entireties.

TECHNICAL FIELD

The present invention relates to radiation-curable formulations which produce coatings having high adhesion to sheets and low contraction, their use, and processes for coating sheets by means of these formulations.

BACKGROUND

From EP 2239286 A1, for example, two-component coating materials are known which can be used to coat substrates and which frequently exhibit good adhesion.

A disadvantage of two-component coating materials, however, is always a limited potlife, which limits the possibilities for processing the coating material.

The desire, however, is for a very long processing life for coating materials, as offered, for example, by radiation-curable coating materials.

EP 902065 (U.S. Pat. No. 6,096,797) discloses radiation-curable coating materials which comprise condensation resins. The adhesion of these coating materials, however, is unsatisfactory.

EP 789065 discloses radiation-curable coating materials which comprise fatty acid-modified polyester resins. The fatty acid modification produces an enhanced adhesion by the coating to substrates, but impairs the compatibility with common radiation-curable coating materials.

Thus, there is a desire to develop radiation-curable formulations having good application properties that exhibit high adhesion to sheets and also exhibit only minimal contraction.

SUMMARY

A first aspect of the invention relates to a radiation-curable formulation. In a first embodiment, a radiation-curable formulation comprises (A) at least one condensation resin synthesized from urea or urea derivatives a1) and ketones or aldehydes a2) selected from C—H acidic aldehydes and ketones or mixtures thereof with formaldehyde, (B) at least one radiation-curable compound having at least 2 acryloyl or methacryloyl groups, (C) at least one radiation-curable compound having free acid groups, (D) at least one (meth)acrylic acid alkyl ester whose alkyl radical has at least 8 carbon atoms, (E) optionally, at least one coating auxiliary and/or additive, and (F) optionally, at least one photoinitiator, the formulation having an acid number of 10 to 100 mg KOH/g, based on the sum of components (A) to (F).

In a second embodiment, the formulation of the first embodiment is modified, wherein component (a1) is urea.

In a third embodiment, the formulation of the first and second embodiments is modified, wherein component (a2) comprises CH-acidic aldehydes or mixtures thereof with formaldehyde.

In a fourth embodiment, the formulation of the first through third embodiments is modified, wherein component (B) comprises (meth)acrylates of compounds of formulae (IVa) to (IVd),

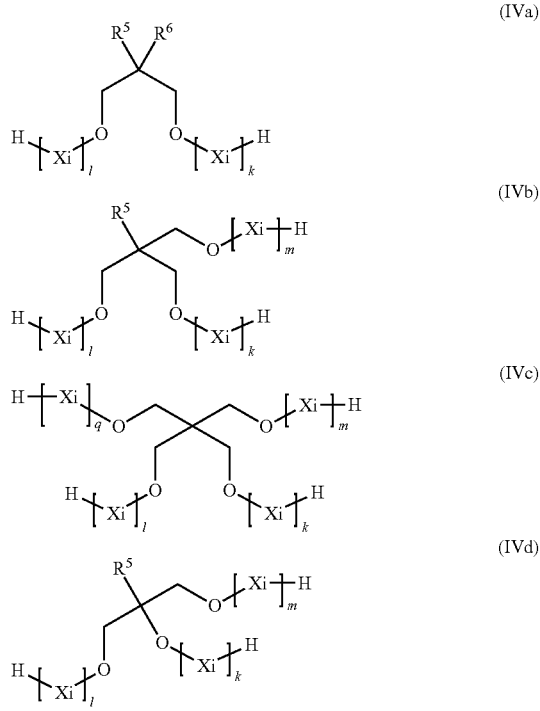

wherein $R^5$ and $R^6$ independently of one another are hydrogen or are $C_1$-$C_{18}$-alkyl optionally substituted with aryl, alkyl, aryloxy, alkyloxy, heteroatoms and/or heterocycles, k, l, m and q independently of one another are each an integer from 1 to 10, and i is 1 to k, 1 to l, 1 to m, and 1 to q, independently of one another, and X is selected from the group —$CH_2$—$CH_2$—O—, —$CH_2$—$CH(CH_3)$—O—, —$CH(CH_3)$—$CH_2$—O—, —$CH_2$—$C(CH_3)_2$—O—, —$C(CH_3)_2$—$CH_2$—O—, —$CH_2$—CHVin-O—, —CHVin-$CH_2$—O—, —$CH_2$—CHPh-O—, and —CHPh-$CH_2$—O—, wherein Ph is phenyl and Vin is vinyl.

In a fifth embodiment, the formulation of the first through fourth embodiments is modified, wherein component (C) comprises compounds of formulae (Va) or (Vb), and also mixtures thereof

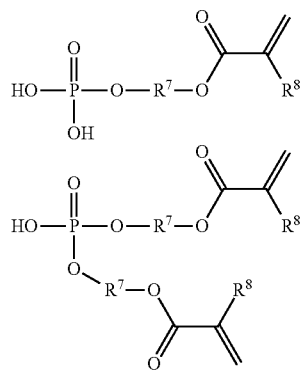

wherein $R^7$ is $C_2$ to $C_6$ alkylene and $R^8$ is hydrogen or methyl.

In a sixth embodiment, the formulation of the first through fifth embodiments is modified, wherein component (D) is selected from the group consisting of n-octyl acrylate, 2-ethylhexyl acrylate, 3-propylheptyl acrylate, n-decyl acrylate, lauryl acrylate, n-octyl methacrylate, 2-ethylhexyl methacrylate, 3-propylheptyl methacrylate, n-decyl methacrylate, and lauryl methacrylate.

In a seventh embodiment, the formulation of the first through sixth embodiments is modified, wherein the formulation comprises: (A) 20 to 50 weight %, (B) 20 to 40 weight %, (C) 2 to 10 weight %, (D) 10 to 30 weight %, (E) 1 to 10 weight %, (F) 0.5 to 5 weight %, with the proviso that the sum total is always 100 weight %.

A second aspect of the invention relates to a process for coating sheets. In an eighth embodiment, a process for coating sheets comprises applying the formulation of the first through seventh embodiments to a sheet of paper and/or nonwovens which have been impregnated with melamine-formaldehyde resins, carrying out at least partial radiation curing, optionally, applying a decorative print, subsequently applying at least one further radiation-curable coating material, and, finally, carrying out complete curing by radiation.

A third aspect of the invention relates to the use of the formulation to coat sheets of paper. In a ninth embodiment, a coated sheet of paper and/or a coated nonwoven comprises a sheet of paper and/or a nonwoven impregnated with a melamine-formaldehyde resin that has been coated with the formulation of the first through eighth embodiments.

A fourth aspect of the invention related to a coating process. In a tenth embodiment, a coating process comprises applying the coated sheet of the ninth embodiment to a substrate selected from wood, woodbase material, wood containing, and combinations thereof.

DETAILED DESCRIPTION

Provided are radiation-curable formulations comprising
(A) at least one condensation resin synthesized from urea or urea derivatives a1) and ketones or aldehydes a2) selected from C—H acidic aldehydes and ketones or mixtures thereof with formaldehyde,
(B) at least one radiation-curable compound having at least 2 acryloyl or methacryloyl groups,
(C) at least one radiation-curable compound having free acid groups,
(D) at least one (meth)acrylic acid alkyl ester whose alkyl radical has at least 8 carbon atoms,
(E) optionally at least one coatings auxiliary and/or additive, specifically for modifying the wetting properties and/or flow properties, and
(F) optionally at least one photoinitiator, the formulation having an acid number to DIN EN ISO 3682 (potentiometric) of 10 to 100 mg KOH/g, based on the sum of components (A) to (F).

In one or more embodiments, the acid number is at least 15, more specifically at least 20, very specifically at least 25, and more particularly at least 30 mg KOH/g.

In one or more embodiments, the acid number is up to 90, more specifically up to 80, very specifically up to 70, and more particularly up to 60 mg KOH/g.

Formulations of the invention exhibit high adhesion to sheets and minimal contraction and can be selected such that for application they are rollable and/or sprayable. Consequently the present invention also provides for the use of the formulations of the invention to coat sheets.

The present invention additionally provides a process for coating sheets by applying a formulation of the invention to a sheet, carrying out at least partial radiation curing, and then applying at least one further radiation-curable coating material, and, lastly, carrying out full curing by radiation.

In one or more embodiments, component (A) comprises at least one, one to three for example, specifically one to two, and more specifically just one condensation resin, synthesized from ureas or urea derivatives a1) and ketones or aldehydes a2) selected from C—H acidic aldehydes and ketones or mixtures thereof with formaldehyde. Admixing component (A) to the formulation of the invention produces a reduction in the contraction of the coating material on curing.

In one or more embodiments, the condensation resin A) is synthesized from urea or urea derivatives a1) and ketones-aldehydes a2).

The urea or urea derivatives a1) comprise more particularly those of the formula

$$R^1\text{—NH—}(C{=}X)\text{—NH—}R^2 \quad \quad (I)$$

or

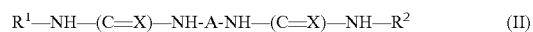

$$R^1\text{—NH—}(C{=}X)\text{—NH-A-NH—}(C{=}X)\text{—NH—}R^2 \quad \quad (II)$$

in which $R^1$ and $R^2$ independently of one another are a H atom or a $C_1$-$C_{20}$ alkyl radical,
A is a $C_1$-$C_{10}$ alkylene radical
and X is oxygen or sulfur.

Specifically, $R^1$ and $R^2$ are a H atom or a $C_1$-$C_4$ alkyl group, A is a $C_1$-$C_4$ alkylene group, and X is oxygen.

In one or more specific embodiments, the condensation resin A comprises compounds of the formula (I).

In very specific embodiments, the condensation resin A comprises urea ($H_2N$—(C=O)—$NH_2$). a2) comprises C—H acidic aldehydes or ketones or mixtures thereof with formaldehyde. Preference is given to CH-acidic aldehydes or mixtures thereof with formaldehyde.

C—H acidic aldehydes or ketones are those having an acidic hydrogen atom on the α-C atom to the carbonyl group.

In one or more embodiments, C—H acidic aldehydes are used.

Suitability is possessed for example by C—H acidic aldehydes of the formula

$$R^3R^4CH\text{—CHO} \quad \quad (III)$$

wherein $R^3$ and $R^4$ independently of one another are a H atom or a $C_1$-$C_{20}$, specifically $C_1$-$C_6$, alkyl group, an aryl group, or a $C_7$ to $C_{20}$, specifically $C_7$-$C_{14}$, alkaryl group. Formaldehyde ($R^3$ and $R^4$=H) is excluded.

In one or more embodiments compounds of the formula (III) having a total of fewer than 20 C atoms are used. With preference not more than one of the radicals $R^3$ and $R^4$ is an alkyl group, aryl group, or alkaryl group.

An example of a ketone is cyclohexanone.

In specific embodiments, compounds a2) are, in particular, isobutyraldehyde, 2-ethylhexanal, 2-methylpentanal, 2-phenylpropanol, and isovaleraldehyde.

Compounds a2) may also be mixtures of the above C—H acidic aldehydes and ketones with formaldehyde.

Specifically, not more than 50 mol %, more particular not more than 30 mol %, of the compounds a2) is formaldehyde.

The condensation resin (A) may be prepared, for example, by acidic condensation of the compounds a1) and a2), particularly in the temperature range from 60 to 150° C.

Corresponding processes are known to the skilled person and are described for example in EP-A-2794.

In one or more embodiments, the condensation resin (A) contains the compounds a1) and a2) in a molar ratio of 1:0.5 to 1:20, more specifically 1:4 to 1:10. The softening point (in accordance with DIN 53 180) of the resin is specifically between 60 and 140° C.

In one or more embodiments, the condensation resin (A) is in solvent-free form. Alternatively it may be present in the form, for example, of a solution in an organic solvent, such as butyl acetate, ethanol, or methyl ethyl ketone for example.

The at least one, specifically one to four, more specifically one to three, very specifically one to two, and especially specifically just one radiation-curable compound (B) having at least 2 acryloyl or methacryloyl groups, specifically two to ten, more specifically two to six, very specifically three to four acryloyl or methacryloyl groups, specifically acryloyl groups, specifically comprises (meth)acrylic esters of polyols, specifically alkoxylated polyols.

Examples of (meth)acrylic esters of polyols are ethylene glycol diacrylate, 1,2-propanediol diacrylate, 1,3-propanediol diacrylate, 1,4-butanediol diacrylate, 1,3-butanediol diacrylate, 1,5-pentanediol diacrylate, 1,6-hexanediol diacrylate, 1,8-octanediol diacrylate, neopentyl glycol diacrylate, 1,1-, 1,2-, 1,3-, and 1,4-cyclohexanedimethanol diacrylate, 1,2-, 1,3-, or 1,4-cyclohexanediol diacrylate, trimethylolpropane triacrylate, ditrimethylolpropane pentaacrylate or hexaacrylate, pentaerythritol triacrylate or tetraacrylate, glycerol diacrylate or triacrylate, and also di- and polyacrylates of sugar alcohols, such as, for example, sorbitol, mannitol, diglycerol, threitol, erythritol, adonitol (ribitol), arabitol (lyxitol), xylitol, dulcitol (galactitol), maltitol, or isomalt.

In one or more embodiments, the (meth)acrylates are those of compounds of the formula (IVa) to (IVd),

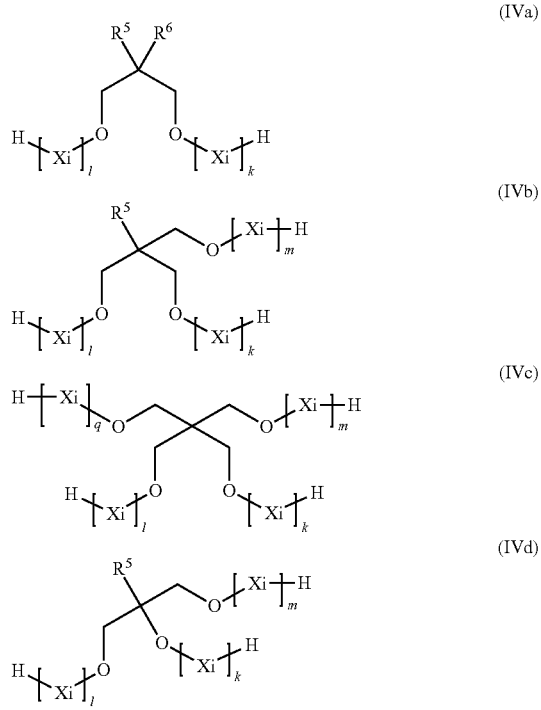

in which
$R^5$ and $R^6$ independently of one another are hydrogen or are $C_1$-$C_{18}$ alkyl which is optionally substituted by aryl, alkyl, aryloxy, alkyloxy, heteroatoms and/or heterocycles, k, l, m, and q independently of one another are each an integer from 1 to 10, specifically 1 to 5, and more specifically 1 to 3, and each X, for i=1 to k, 1 to l, 1 to m, and 1 to q independently of one another may be selected from the group —$CH_2$—$CH_2$—O—, —$CH_2$—$CH(CH_3)$—O—, —$CH(CH_3)$—$CH_2$—O—, —$CH_2$—$C(CH_3)_2$—O—, —$C(CH_3)_2$—$CH_2$—O—, —$CH_2$—CHVin-O—, —CHVin-$CH_2$—O—, —$CH_2$—CHPh-O—, and —CHPh-$CH_2$—O—, specifically from the group —$CH_2$—$CH_2$—O—, —$CH_2$—$CH(CH_3)$—O—, and —$CH(CH_3)$—$CH_2$—O—, and more specifically —$CH_2$—$CH_2$—O—, in which Ph is phenyl and Vin is vinyl.

$C_1$-$C_{18}$-Alkyl therein that is optionally substituted by aryl, alkyl, aryloxy, alkyloxy, heteroatoms and/or heterocycles is for example methyl, ethyl, propyl, isopropyl, n-butyl, sec-butyl, tert-butyl, pentyl, hexyl, heptyl, octyl, 2-ethylhexyl, 2,4,4-trimethylpentyl, decyl, dodecyl, tetradecyl, hetadecyl, octadecyl, 1,1-dimethylpropyl, 1,1-dimethylbutyl, 1,1,3,3-tetramethylbutyl, specifically methyl, ethyl, or n-propyl, very specifically methyl or ethyl.

The (meth)acrylates in question are more specifically those of one to twenty and very specifically three to ten ethoxylated, propoxylated, or mixtures of ethoxylated and propoxylated, and especially exclusively ethoxylated, glycerol, trimethylolpropane, trimethylolethane, or pentaerythritol.

Especially preferred trimethylolpropane triacrylate, pentaerythritol tetraacrylate, and acrylates of one to twenty alkoxylated, more specifically ethoxylated, trimethylolpropane, glycerol, or pentaerythritol.

The compound (C) is at least one radiation-curable compound having at least one, specifically one to three, more specifically one to two, and very specifically one free acid group.

The free acid groups may be, for example, carboxyl, sulfate, sulfite, phosphate, or phosphite groups or, in the case of sulfate, sulfite, phosphate, or phosphite groups, their partial esters.

In one or more embodiments, the compounds (C) have at least one radiation-curable group, specifically one to two radiation-curable groups, more specifically (meth)acrylate groups.

In one or more embodiments, the compounds (C) have a molecular weight of not more than 1000 g/mol, more specifically not more than 800 g/mol, very specifically not more than 500 g/mol, more particularly of not more than 400, and especially of not more than 350 g/mol.

Examples of compound (C) are acrylic acid, methacrylic acid, ethacrylic acid, α-chloroacrylic acid, crotonic acid, maleic acid, vinylsulfonic acid, vinylphosphonic acid, maleic acid, fumaric acid, itaconic acid, citraconic acid, mesaconic acid, glutaconic acid, aconitic acid, cinnamic acid, allylsulfonic acid, sulfoethyl acrylate, sulfoethyl methacrylate, sulfopropyl acrylate, sulfopropyl methacrylate, 2-hydroxy-3-acryloyloxypropylsulfonic acid, 2-hydroxy-3-methacryloyloxypropylsulfonic acid, allylphosphonic acid, styrenesulfonic acid, 2-acrylamido-2-methylpropanesulfonic acid, and 2-acrylamido-2-methylpropanephosphonic acid.

In one specific embodiment, the compound (C) comprises compounds of the formulae (Va) and (Vb), and also mixtures thereof

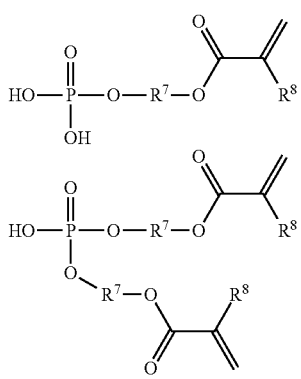

wherein

R$^7$ is C$_2$ to C$_6$ alkylene and

R$^8$ is hydrogen or methyl.

C$_2$-C$_6$ alkylene denotes for example 1,2-ethylene, 1,2-propylene, 1,3-propylene, 1,2-butylene, 1,3-butylene, 1,4-butylene, 1,5-pentylene, or 1,6-hexylene, specifically 1,2-ethylene, 1,2-propylene, 1,3-propylene, or 1,4-butylene, more specifically 1,2-ethylene or 1,2-propylene, and very specifically 1,2-ethylene.

R$^8$ here is specifically methyl.

In one or more embodiments, component (D) comprises at least one, specifically one to three, more specifically one to two, and very specifically just one (meth)acrylic acid alkyl ester whose alkyl radical has at least 8 carbon atoms, specifically eight to 20, more specifically eight to 16, very specifically eight to 14, and more particularly ten to twelve.

With very particular preference component (D) is selected from the group consisting of n-octyl acrylate, 2-ethylhexyl acrylate, 3-propylheptyl acrylate, n-decyl acrylate, lauryl acrylate, n-octyl methacrylate, 2-ethylhexyl methacrylate, 3-propylheptyl methacrylate, n-decyl methacrylate, and lauryl methacrylate.

More particularly component (D) is 2-ethylhexyl acrylate, 3-propylheptyl acrylate, or lauryl acrylate.

In one or more embodiments, the optional component (E) comprises at least one coating auxiliary and/or additive, specifically for modifying the wetting properties and/or flow properties.

In one or more embodiments, examples of coatings auxiliaries and additives optional as (E) include antioxidants, stabilizers, activators (accelerators), fillers, colorants, antistatic agents, flame retardants, surface-active agents, viscosity modifiers, or plasticizers.

There may also be one or more thermally activable initiators added, as for example potassium peroxodisulfate, dibenzoyl peroxide, cyclohexanone peroxide, di-tert-butyl peroxide, azobisisobutyronitrile, cyclohexylsulfonyl acetyl peroxide, diisopropyl percarbonate, tert-butyl peroctoate, or benzpinacol, and also, for example, those thermally activable initiators which have a half-life at 80° C. of more than 100 hours, such as di-t-butyl peroxide, cumene hydroperoxide, dicumyl peroxide, t-butyl perbenzoate, silylated pinacols, which are available commercially for example under the trade name ADDID 600 from Wacker, or hydroxyl-containing amine N-oxides, such as 2,2,6,6-tetramethylpiperidine-N-oxyl, 4-hydroxy-2,2,6,6-tetramethylpiperidine-N-oxyl, etc.

Other examples of suitable initiators are described in "Polymer Handbook", 2nd edn., Wiley & Sons, New York.

Suitable fillers include silicates, examples being silicates obtainable by silicon tetrachloride hydrolysis, such as Aerosil® from Evonik, siliceous earth, talc, aluminum silicates, magnesium silicates, calcium carbonates, etc.

Suitable stabilizers include typical UV absorbers such as oxanilides, triazines, and benzotriazole (the latter available as Tinuvin® products from BASF SE, Ludwigshafen) and benzophenones. They can be used alone or together with suitable radical scavengers, examples being sterically hindered amines such as 2,2,6,6-tetramethylpiperidine, 2,6-di-tert-butylpiperidine, or derivatives thereof, e.g., bis(2,2,6,6-tetramethyl-4-piperidyl) sebacate. Stabilizers are used typically in amounts of 0.1 to 5.0 weight %, based on the solid components present in the formulation.

The optional component (F) comprises at least one photoinitiator, specifically one to three, and more specifically one photoinitiator or mixtures of two photoinitiators.

The photoinitiator (F) is generally dispensable if the coating material is cured using electron beams. For curing of the coating material with UV radiation, however, at least one photoinitiator is necessary.

As photoinitiators it is possible to use photoinitiators known to the skilled person, examples being those stated in "Advances in Polymer Science", Volume 14, Springer Berlin 1974 or in K. K. Dietliker, Chemistry and Technology of UV- and EB-Formulation for Coatings, Inks and Paints, Volume 3; Photoinitiators for Free Radical and Cationic Polymerization, P. K. T. Oldring (ed.), SITA Technology Ltd, London.

Examples of those contemplated include phosphine oxides, benzophenones, α-hydroxyalkyl aryl ketones, thioxanthones, anthraquinones. acetophenones, benzoins and benzoin ethers, ketals, imidazoles, or phenylglyoxylic acids.

Photoinitiators contemplated are those as described in WO 2006/005491 A1, page 21, line 18 to page 22, line 2 (corresponding to US 2006/0009589 A1, paragraph [0150]), hereby made part of the present disclosure by reference.

The following compounds may be cited as examples of the individual classes:

Mono- or bisacylphosphine oxides, such as Irgacure® 819 (bis(2,4,6-trimethylbenzoyl)phenylphosphine oxide), of the kind described for example in EP-A 7 508, EP-A 57 474, DE-A 196 18 720, EP-A 495 751, or EP-A 615 980, examples being 2,4,6-trimethylbenzoyldiphenylphosphine oxide (Lucirin® TPO), ethyl 2,4,6-trimethylbenzoylphenyl-phosphinate, and bis(2,6-dimethoxybenzoyl)-2,4,4-trimethylpentylphosphine oxide, benzophenone, 4-aminobenzophenone, 4,4'-bis(dimethylamino)benzophenone, 4-phenylbenzophenone, 4-chlorobenzophenone, Michler's ketone, o-methoxybenzophenone, 2,4,6-trimethylbenzophenone, 4-methylbenzophenone, 2,4-dimethylbenzophenone, 4-isopropylbenzophenone, 2-chlorobenzophenone, 2,2'-dichlorobenzophenone, 4-methoxybenzophenone, 4-propoxybenzophenone, or 4-butoxybenzophenone 1-benzoylcyclohexan-1-ol (1-hydroxycyclohexyl phenyl ketone), 2-hydroxy-2,2-dimethylacetophenone (2-hydroxy-2-methyl-1-phenylpropan-1-one), 1-hydroxyacetophenone, 1-[4-(2-hydroxyethoxy)phenyl]-2-hydroxy-2-methyl-1-propan-1-one, and polymer comprising in copolymerized form 2-hydroxy-2-methyl-1-(4-isopropen-2-ylphenyl)propan-1-one (Esacure® KIP 150)

10-thioxanthenone, thioxanthen-9-one, xanthen-9-one, 2,4-dimethylthioxanthone, 2,4-diethylthioxanthone, 2,4-diisopropylthioxanthone, 2,4-dichlorothioxanthone, and chloroxanthenone, β-methylanthraquinone, tert-butylanthraquinone, anthraquinonecarbonyl acid esters, benz[de]anthracen-7-one, benz[a]anthracene-7,12-dione, 2-methylanthraquinone, 2-ethylanthraquinone, 2-tert-butylanthraquinone, 1-chloroanthraquinone, and 2-amylanthraquinone acetophenone, acetonaphthoquinone, valerophenone, hexanophenone, α-phenylbutyrophenone, p-morpholinopropiophenone, dibenzosuberone, 4-morpholinobenzophenone, p-diacetylbenzene, 4'-methoxyacetophenone, α-tetralone, 9-acetylphenanthrene, 2-acetylphenanthrene, 3-acetylphenanthrene, 3-acetylindole, 9-fluorenone, 1-indanone, 1,3,4-triacetylbenzene, 1-acetonaphthone, 2-acetonaphthone, 2,2-dimethoxy-2-phenylacetophenone, 2,2-diethoxy-2-phenylacetophenone, 1,1-dichloroacetophenone, 1-hydroxyacetophenone, 2,2-diethoxyacetophenone, 2-methyl-1-[4-(methylthio)phenyl]-2-morpholinopropan-1-one, and 2,2-dimethoxy-1,2-diphenylethan-2-one, 2-benzyl-2-dimethylamino-1-(4-morpholinophenyl)butan-1-one 4-morpholinodeoxybenzoin, benzoin, benzoin isobutyl ether, benzoin tetrahydropyranyl ether, benzoin methyl ether, benzoin ethyl ether, benzoin butyl ether, benzoin isopropyl ether, and 7-H-benzoin methyl ether, acetophenone dimethyl ketal, 2,2-diethoxyacetophenone, and benzil ketals, such as benzil dimethyl ketal, phenylglyoxalic acids as described in DE-A 198 26 712, DE-A 199 13 353, or WO 98/33761, benzaldehyde, methyl ethyl ketone, 1-naphthaldehyde, triphenylphosphine, tri-o-tolylphosphine, and 2,3-butanedione.

Particularly noteworthy mixtures are 2-hydroxy-2-methyl-1-phenylpropan-2-one and 1-hydroxycyclohexyl phenyl ketone, bis(2,6-dimethoxybenzoyl)-2,4,4-trimethylpentylphosphine oxide and 2-hydroxy-2-methyl-1-phenylpropan-1-one,
benzophenone and 1-hydroxycyclohexyl phenyl ketone,
bis(2,6-dimethoxybenzoyl)-2,4,4-trimethylpentylphosphine oxide and 1-hydroxycyclohexyl phenyl ketone,
2,4,6-trimethylbenzoyldiphenylphosphine oxide and 2-hydroxy-2-methyl-1-phenylpropan-1-one,
2,4,6-trimethylbenzophenone and 4-methylbenzophenone, or
2,4,6-trimethylbenzophenone and 4-methylbenzophenone and 2,4,6-trimethylbenzoyldiphenylphosphine oxide.

In one or more embodiments, the formulations of the invention have a composition as follows:
(A) 20 to 50 weight %, specifically 30 to 35 weight %
(B) 20 to 40 weight %, specifically 25 to 30 weight %
(C) 2 to 10 weight %, specifically 4 to 8 weight %
(D) 10 to 30 weight %, specifically 15 to 25 weight %
(E) 1 to 10 weight %, specifically 3 to 8 weight %
(F) 0.5 to 5 weight %, specifically 2 to 4 weight % with the proviso that the sum total is always 100 weight %.

The formulations of the invention can be used with preference to coat sheets of paper and/or nonwovens, specifically paper, which have been impregnated with melamine-formaldehyde resins. Melamine-formaldehyde resins for the purposes of the present specification are a reaction product of melamine, formaldehyde, and alcohols. In accordance with the invention, the constitution and nature of the melamine-formaldehyde resin used for impregnation have no part, or at best a minor part, to play.

The sheets thus coated can be used to coat wood, woodbase materials, and wood-containing substrates, specifically fiberboard panels. Also conceivable is the coating of cellulosic fibers, such as paper, paperboard, or cardboard, for example.

The term "woodbase materials" is used in the context of the present specification as a collective term for various products which are formed by breaking down wood and then assembling it, usually with addition of other substances such as, for example, adhesives and/or resins or mineral binder. These materials include, for example, solid wood boards (DIN EN 12775: 2001-04), plywood (DIN EN 313-2: 1999-11), particle boards (DIN EN 300: 1997-06, DIN EN 309: 1992-08, DIN EN 633: 1993-12), laminated boards (DIN EN 438-1: 2002-06), and fiberboards (DIN EN 316: 1999-12), and laminated wood formed by gluing from veneers.

Solid wood boards are boards composed of pieces of wood bonded adhesively in one or more plies.

Plywood is a composite of thin layers or "plies" bonded to one another, the fiber directions of successive plies being arranged at right angles to one another and so blocking one another.

Particle boards are produced by compressing small pieces of wood with synthetic resins, natural substances, or—albeit less specifically—mineral materials such as cement (wood cement boards) and gypsum. A distinction is therefore made between particle boards with orientation of the particles (OSB=oriented structural board), particle boards with little or no orientation of the particles (e.g., flat-pressed particle boards), and cement-bound particle boards. They are more isotropic than solid wood and have better durability and, depending on the density, greater homogeneity of the surface. They are grouped according to service types and are classed by the free formaldehyde content. Particle boards mostly serve as substrates for other coatings, such as film coatings, for example.

Laminated boards (decorative high-pressure laminates) consist of paper webs which have been impregnated with, for example, melamine resins and/or phenolic resins (melamine laminates) and compressed at elevated temperature. In accordance with DIN EN 438-1:1992-12, they are identified, depending on the mode of compression, as HPL (high pressure laminates) or CPL (continuous pressure laminates), and are used specifically on heavy-duty furniture, such as on kitchen worktops, for example.

Fiberboards are produced from ligneous fibers without binder by a wet process or with binder by a dry process, as single-layer or multilayer boards. They are again largely isotropic in the plane of the board. Their properties depend on the degree of grinding of the fiber stock, the production conditions (temperature, duration, and profile of pressing), the method and amount of gluing, the density and the distribution thereof over the cross section of the board, the moisture content of the material, and the aftertreatment. A distinction is made between porous, hard, and medium-hard fiberboards for the building industry, medium-hard fiberboards for furniture, bitumen fiberboards, and decorative, plastics-coated fiberboards. The medium-hardboards are identified colloquially as medium-density fiberboards (MDF). They have thicknesses of in general 3-60 mm and densities of 350-850 kg/m$^3$. High-density fiberboards (HDF) have even higher densities. Owing to their highly homogeneous structure, they can also be laminated directly onto profiled narrow surfaces, and coated.

In specific embodiments, the woodbase materials are fiberboards.

Coating of the sheets with the formulations of the invention takes place in accordance with customary processes known to the skilled person, where at least one formulation of the invention is applied in the desired thickness to the sheet that is to be coated and is optionally at least partly radiation-cured. This operation may be repeated one or more times if desired. Application to the substrate may take place in a known way, as for example by spraying, troweling, knifecoating, brushing, rolling, roller coating, casting, laminating, injection backmolding, or coextruding, specifically by spraying and roller coating. Examples of spraying techniques that may be employed include air-pressure, airless, or electrostatic spraying methods.

The coating thickness is generally in a range from about 3 to 50 g/m² and specifically 5 to 20 g/m².

Additionally disclosed is a process for coating sheets by applying to a sheet at least one formulation of the invention and curing it at least partly by radiation. The coating thus obtained may then be provided, optionally, with a decorative print, and subsequently at least one further radiation-curable coating material may be applied, whereupon, lastly, full curing is carried out by radiation.

The type and nature of the further radiation-curable coating material is not essential to the invention. The coating material involved may be any desired coating material radiation-curable per se to the skilled person. Such materials specifically comprise polyether (meth)acrylates, polyester (meth)acrylates, epoxy (meth)acrylates, or urethane (meth)acrylates, specifically polyester (meth)acrylates and urethane (meth)acrylates, and more specifically a urethane (meth)acrylate.

The radiation cure takes place with high-energy light, such as UV light, for example, or electron beams. The radiation cure may take place at relatively high temperatures. Preference in this case is given to a temperature above the $T_g$ of the radiation-curable binder.

Curing by electron beams or UV exposure may take place under an oxygen-containing atmosphere or, specifically, under inert gas, optionally at temperatures up to the level of the drying temperature.

Radiation curing here is the radical polymerization of polymerizable compounds by means of electromagnetic and/or particulate radiation, specifically UV light in the wavelength range of $\lambda=200$ to 700 nm and/or electron radiation in the range from 150 to 300 keV, and more specifically with a radiation dose of at least 80, specifically 80 to 3000 mJ/cm².

Besides a radiation cure there may also be other curing mechanisms involved, as for example thermal curing, moisture curing, chemical curing and/or oxidative curing—but this is less preferred.

It is optionally possible, if two or more coats of the coating material are applied one above another, for a drying operation and/or radiation cure to take place following each coating operation.

Examples of suitable radiation sources for the radiation cure are low-pressure, medium-pressure, with high-pressure mercury emitters and also fluorescent tubes, pulsed emitters, metal halide emitters, lasers, pulsed lamps (flash light), halogen lamps, electronic flash devices, allowing a radiation cure without photoinitiator, or excimer emitters.

It is of course also possible to use two or more radiation sources for curing—two to four, for example.

These sources may also each emit in different wavelength ranges.

Irradiation may also, optionally, be carried out in the absence of oxygen, such as under an inert-gas atmosphere, for example. Suitable inert gases are specifically nitrogen, noble gases, carbon dioxide, or combustion gases. Irradiation may also take place with the coating material covered by transparent media. Examples of transparent media are polymeric films, glass, or liquids, e.g., water. In specific embodiments, irradiation is performed in the manner described in DE-A1 199 57 900.

Unless otherwise indicated, ppm and percent figures used in this specification relate to ppm and percent by weight.

The examples which follow are intended to elucidate the invention but not to confine it to these examples.

EXAMPLES

The coating materials as per the table below were coated in a film thickness of approximately 15 g/m² onto paper impregnated with melamine-formaldehyde resin, and were initially gelled by UV irradiation with a mercury vapor emitter (120 W/cm power) at a speed of 5 m/min, and recoated with a flexible topcoat (approximately 20 g/m²). This topcoat was then cured by UV irradiation with a mercury vapor emitter (120 W/cm power) at a speed of 5 m/min.

The composition of the topcoat was as follows:

| | |
|---|---|
| Laromer ® PE 44 F | 33.0 parts |
| Laromer ® LR 8981 | 33.0 parts |
| Laromer ® DPGDA | 30.0 parts |
| Irgacure ® 500 | 4.0 parts |

Laromer® PE 44 F from BASF SE, Ludwigshafen, is a commercial polyester acrylate.

Laromer® LR 8981 from BASF SE, Ludwigshafen, is another commercial polyester acrylate.

Laromer® DPGDA from BASF SE, Ludwigshafen, is dipropylene glycol diacrylate as reactive diluent for radiation-curable coatings.

Irgacure® 500 from BASF SE, Ludwigshafen, is a liquid mixture of two photoinitiators: 50% 1-hydroxycyclohexyl phenyl ketone and 50% benzophenone.

| | Example | | | | |
|---|---|---|---|---|---|
| | 1 | 2 (comparative) | 3 (comparative) | 4 (comparative) | 5 (comparative) |
| Laromer ® LR 9013 | 64.0 parts | 70.9 parts | 79.5 parts | 64.0 parts | 79.5 parts |
| Laromer ® PA 9083 | 8.6 parts | 8.6 parts | | 8.6 parts | |
| Propylheptyl acrylate | 21.5 parts | | | | |
| DPGDA | | | | 30.0 parts | 30.0 parts |
| Lauryl acrylate | 5.4 parts | | | | |

-continued

| | Example | | | | |
|---|---|---|---|---|---|
| | 1 | 2 (comparative) | 3 (comparative) | 4 (comparative) | 5 (comparative) |
| Darocur® 1173 | 3.0 parts | 3.0 parts | 3.0 parts | 3.0 parts | 3.0 parts |
| Acid number [mg KOH/g] | about 25 | about 25 | — | about 25 | — |
| Adhesion cross-cut | 0 | 4-5 | 5 | 1-2 | 5 |

The adhesion with cross-cut was determined in accordance with DIN EN ISO 2409. In this test, an evaluation of 0 means very good adhesion, through to no adhesion for an evaluation of 5.

Laromer® PA 9013 from BASF SE, Ludwigshafen, is a commercial trifunctional polyether acrylate (inventive component (B)) modified with a dispersing resin based on isobutyraldehyde, urea, and formaldehyde (inventive component (A)).

Laromer® PA 9083 from BASF SE, Ludwigshafen, is a commercial acrylated phosphoric ester (inventive component (C)).

Darocur® 1173 is a liquid photoinitiator: 2-hydroxy-2-methyl-1-phenylpropan-1-one (CAS No. 7473-98-5)

From the examples it is apparent that
a resin with low contraction (Laromer® LR 9013) alone (example 3) or in combination with a reactive diluent (example 5) produces poor adhesion
the admixing of a resin with acidic groups (Laromer® PA 9083) alone improves the adhesion only a little (example 2)
only through combining the admixing of a resin having acidic groups (Laromer® PA 9083) with a reactive diluent (example 4) is the adhesion improved, and
this result is optimized through use of hydrophobic reactive diluents (example 1).

What is claimed is:
1. A radiation-curable formulation comprising
(A) 20 to 50 weight % of at least one condensation resin synthesized from urea or urea derivatives a1) and ketones or aldehydes a2) selected from C—H acidic aldehydes and ketones or mixtures thereof with formaldehyde,
(B) 20 to 40 weight % of at least one radiation-curable compound having at least 2 acryloyl or methacryloyl groups,
(C) 2 to 10 weight % of at least one radiation-curable compound having free acid groups,
(D) 10 to 30 weight % of at least one (meth)acrylic acid alkyl ester whose alkyl radical has at least 8 carbon atoms,
(E) 1 to 10 weight % of at least one coating auxiliary and/or additive, and
(F) 0.5 to 5 weight % at least one photoinitiator,
wherein:
amounts for components (A), (B), (C), (D), (E), and (F) sum to 100 weight %, and
the formulation has an acid number of 10 to 100 mg KOH/g, based on the sum of components (A) to (F).

2. The formulation of claim 1, wherein component (a1) is urea.

3. The formulation of claim 1, wherein component (a2) comprises CH-acidic aldehydes or mixtures thereof with formaldehyde.

4. The formulation of claim 1, wherein component (B) comprises an ester of (meth)acrylic acid with a compound according to one of formula (IVa) to (IVd),

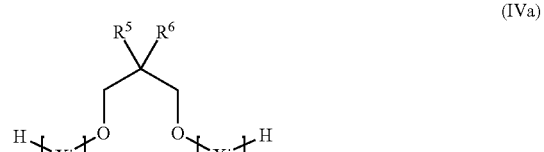

(IVa)

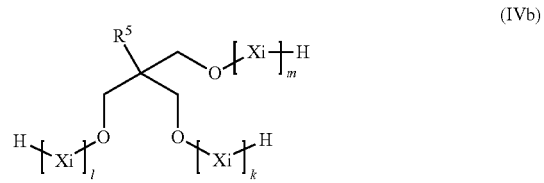

(IVb)

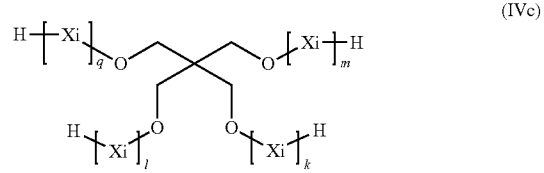

(IVc)

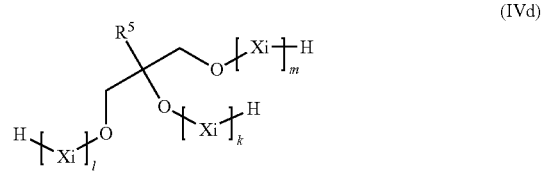

(IVd)

wherein $R^5$ and $R^6$ independently of one another are hydrogen or are $C_1$-$C_{18}$-alkyl optionally substituted with aryl, alkyl, aryloxy, alkyloxy, heteroatoms and/or heterocycles, k, l, m and q independently of one another are each an integer from 1 to 10, and i is 1 to k, 1 to I, 1 to m, and 1 to q, independently of one another, and X is selected from the group —CH$_2$—CH$_2$—O—, —CH$_2$—CH(CH$_3$)—O—, —CH(CH$_3$)—CH$_2$—O—, —CH$_2$—C(CH$_3$)$_2$—O—, —C(CH$_3$)$_2$—CH$_2$—O—, —CH$_2$—CHVin-O—, —CHVin-CH$_2$—O—, —CH$_2$—CHPh-O—, and —CHPh-CH$_2$—O—, wherein Ph is phenyl and Vin is vinyl.

5. The formulation of claim 1, wherein component (C) comprises compounds of formulae (Va) or (Vb), and mixtures thereof,

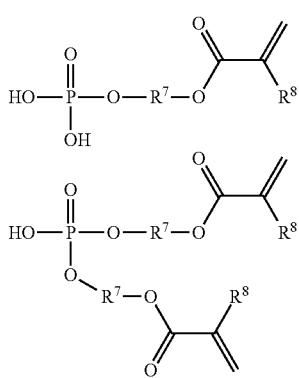

wherein
R⁷ is $C_2$ to $C_6$ alkylene and
R⁸ is hydrogen or methyl.

6. The formulation of claim 1, wherein component (D) is selected from the group consisting of n-octyl acrylate, 2-ethylhexyl acrylate, 3-propylheptyl acrylate, n-decyl acrylate, lauryl acrylate, n-octyl methacrylate, 2-ethylhexyl methacrylate, 3-propylheptyl methacrylate, n-decyl methacrylate, and lauryl methacrylate.

7. A process for coating sheets, the process comprising applying the formulation of claim 1 to a sheet of paper and/or nonwovens which have been impregnated with melamine-formaldehyde resins, carrying out at least partial radiation curing, optionally, applying a decorative print, subsequently applying at least one further radiation-curable coating material, and, finally, carrying out complete curing by radiation.

8. A coated sheet of paper and/or a coated nonwoven comprising a sheet of paper and/or a nonwoven impregnated with a melamine-formaldehyde resin that has been coated with the formulation of claim 1.

9. A coating process comprising applying the sheet of claim 8 to a substrate selected from wood, woodbase material, wood containing, and combinations thereof.

* * * * *